United States Patent
Hermann et al.

(10) Patent No.: US 7,814,045 B2
(45) Date of Patent: Oct. 12, 2010

(54) SEMANTICAL PARTITIONING OF DATA

(75) Inventors: Alexander Hermann, Heidelberg (DE); Rainer Höltke, Angelbachtal (DE); Michael Te Uhle, Wiesloch (DE); Uwe Schulte, Mauer (DE)

(73) Assignee: SAP AG, Walldorf (DE)

( * ) Notice: Subject to any disclaimer, the term of this patent is extended or adjusted under 35 U.S.C. 154(b) by 240 days.

(21) Appl. No.: 11/543,328

(22) Filed: Oct. 4, 2006

(65) Prior Publication Data
US 2008/0086478 A1      Apr. 10, 2008

(51) Int. Cl.
*G06F 17/00* (2006.01)
(52) U.S. Cl. .................................... 707/600
(58) Field of Classification Search ................. 707/600
See application file for complete search history.

(56) References Cited

U.S. PATENT DOCUMENTS

| | | | |
|---|---|---|---|
| 6,260,043 B1* | 7/2001 | Puri et al. | 707/101 |
| 6,327,590 B1* | 12/2001 | Chidlovskii et al. | 707/5 |
| 6,477,535 B1* | 11/2002 | Mirzadeh | 707/101 |
| 6,549,918 B1* | 4/2003 | Probert et al. | 707/203 |
| 6,826,748 B1* | 11/2004 | Hohensee et al. | 717/130 |
| 7,111,290 B1* | 9/2006 | Yates et al. | 717/158 |
| 2002/0161744 A1* | 10/2002 | Gluckman | 707/1 |
| 2003/0176931 A1* | 9/2003 | Pednault et al. | 700/31 |
| 2003/0233376 A1* | 12/2003 | Bussler et al. | 707/104.1 |
| 2004/0243590 A1* | 12/2004 | Gu et al. | 707/100 |
| 2006/0095248 A1* | 5/2006 | Menezes et al. | 704/3 |
| 2006/0101058 A1* | 5/2006 | Chidlovskii | 707/102 |
| 2006/0111896 A1* | 5/2006 | Menezes et al. | 704/10 |
| 2006/0173926 A1* | 8/2006 | Kornelson et al. | 707/200 |
| 2006/0271567 A1* | 11/2006 | Jain et al. | 707/100 |
| 2007/0027904 A1* | 2/2007 | Chow et al. | 707/102 |
| 2008/0249981 A1* | 10/2008 | Norring et al. | 707/2 |

* cited by examiner

*Primary Examiner*—Charles Kim
*Assistant Examiner*—Kurt Mueller
(74) *Attorney, Agent, or Firm*—Mintz, Levin, Cohn, Ferris, Glovsky and Popeo, P.C.

(57) ABSTRACT

Data can be extracted from one or more data sources. Thereafter, the extracted data can be transformed to a format compatible with a plurality of structurally identical data targets so that the transformed data can be loaded into the plurality of data targets via data transfer processes. The data transfer processes define disjoint data sets among the plurality of data targets. Related apparatus, systems, methods, and articles are also described.

13 Claims, 4 Drawing Sheets

SEMANTICAL PARTITIONING OF DATA

TECHNICAL FIELD

The subject matter described herein relates to the semantic-based partitioning of data such as business intelligence data within a data warehousing environment.

BACKGROUND

Enterprise wide data warehouses are becoming increasingly adopted as the main source and underlying infrastructure for business intelligence (BI) solutions. As a result, data warehouse frameworks being utilized must be configured to handle high data throughput.

With conventional data warehousing scenarios, well defined time windows are used to extract data from source systems and to store it in flat tables (e.g. DataStore objects, etc.) or in multi-dimensional data targets (e.g., InfoCubes, etc.). The following factors can influence the amount of time required to make data available for reporting: (i) time for propagating data to data targets (data loading time); and (ii) time needed for administrative tasks (e.g. dropping and re-creating indexes, activation of data in DataStore objects, rebuilding of aggregate data, etc.). The challenge, in particular for mass data, is to complete the steps within the defined time window.

Another aspect that can affect data availability is the degree of data coupling. In some implementations, data generated by differing source systems must be processed in a sequential manner (as opposed to concurrent processing). For example, if data "d1" generated by source system "s1" is closely coupled to data "d2" generated by source system "s2" the following restrictions might apply: (i) if "d1" and "d2" are generated in different time zones reporting (e.g. in a DataStore object, etc.) cannot be performed until both loading processes are finished. Otherwise the query result can include inconsistencies; and (ii) if "d2" is loaded into a data target (e.g. a DataStore object) after "d1" and the upload for "d1" failed, "d2" is also not available for reporting—despite the fact that "d1" has caused the uploading issue.

SUMMARY

In one aspect, data is extracted from one or more data sources. Thereafter, the extracted data is transformed to a format compatible with a plurality of structurally identical data targets so that the transformed data can be loaded into the plurality of data targets via data transfer processes. Such data transfer processes define disjoint data sets among the plurality of data targets.

In some implementations, the loading can concurrently load data from at least two of the data targets. In these and other implementations, the transforming can comprise mapping data from the one or more data sources to data in the one or more data targets (e.g., InfoProvider with data storage, etc.) using predefined transformation rules.

The extracted data can be reported in a variety of mechanisms such as a Query and/or a MultiProvider. In some implementations, data can be populated to additional data targets such as an InfoCube (which comprises a plurality of relational tables arranged according to a star schema).

In an interrelated aspect, a plurality of structurally identical data targets can be derived from a master object. Thereafter, data transfer processes coupling the data targets to one or more data sources can be defined. The data transfer processes define disjoint semantic partitions among the plurality of structurally identical data targets.

In some variations, an overflow data provider can be defined that contains all data that are not associated with one or more of the data targets. Additionally, in such arrangements, an overflow data transfer process coupling the overflow data provider to the one or more data sources can be defined.

In yet another interrelated aspect, a system includes one or more data sources, a first data collection module, a second data collection module, and a plurality of data targets. The first data collection module characterizes data available in the one or more data sources and is connected to the one or more data sources via a first set of transformations. The first set of transformations map data from the one or more data sources from a first format to a second format. The second data collection module characterizes data available for the plurality of data targets and is connected to the first data collection module via a second transformation. The data targets are structurally identical and are connected to the second data collection module via a third set of transformations.

The data targets are respectively coupled to the one or more data sources by disjoint data transfer processes so that each data target can include a distinct data set. These disjoint data transfer processes can be partitioned according to semantics associating data sets derivable from the data sources with the data targets.

The system can include a third data collection module that characterizes data available in the one or more data targets. The third collection module can be connected to the one or more data targets via a fourth set of transformations. At least one of the first, second, and third data collection modules can be an InfoSource.

An overflow data provider can also be implemented that characterizes all data sets that are not associated with one or more of the data targets. The overflow data provider can, for example, be connected to the second data collection module. In addition, in some variations, the data targets are derived from a master meta data object and/or can be configured to hold disjunctive data sets.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, the current techniques that provide for data decoupling allow for extraction and data loading to be conducted in parallel for all (or a portion) of data targets which results in faster upload times and reduces an amount of time required to recover from a failure. In addition, the impact of a failure is much lower than compared to conventional modeling approaches. Moreover, administrative functions can be performed in parallel even if a single functionality is not able to be executed in parallel. Furthermore, specified data targets can be earlier enabled for reporting because, in some implementations, the amount of data to be processed is considerably smaller, data can be decoupled by selecting appropriate partition criteria, query performance can be improved through parallel execution and smaller data targets, and semantical partitioning can be combined with physical partitioning to further increase performance. Yet further, semantical partitioning is independent of the database management system (DBMS) being utilized so that data warehouses can be migrated from one platform to another without the need to change the underlying storage and retrieval models.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
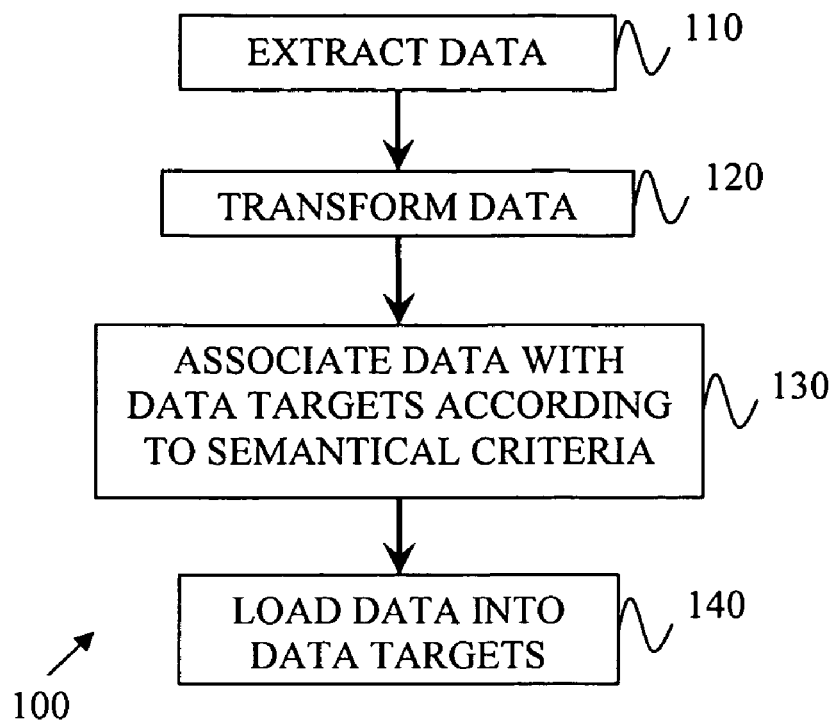
FIG. 1 is a process flow diagram illustrating an extraction of data from one or more data sources in response to a receipt of a query.

FIG. 1 is a process flow diagram illustrating a method 100 in which, at 110, data is extracted from one or more data sources. This extracted data is transformed, at 120, to a format compatible with a plurality of structurally identical data targets. Once the transformation is complete, the transformed data is associated with data targets using semantical criteria, at 130, and loaded, at 140, into the plurality of data targets via data transfer processes. The data transfer processes define disjoint data sets among the plurality of data targets.

Figure 2:
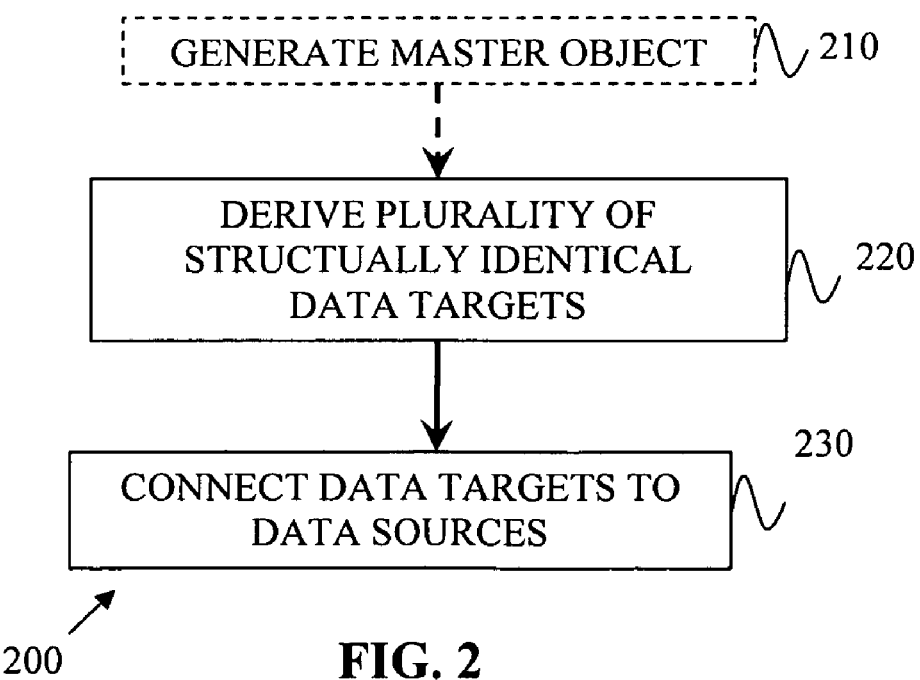
FIG. 2 is a process flow diagram illustrating a semantic partitioning of data storage.

FIG. 2 is a process flow diagram, interrelated to FIG. 1, in which a method 200 for semantically partitioning data stored in a data warehouse is illustrated. A plurality of structurally identical data targets are derived, at 220, from a master object. Subsequently, at 230, data transfer processes coupling the data targets to the one or more data sources are defined. The data transfer processes define disjoint semantic partitions among one or more data targets. In some implementations, a master object may be generated (e.g., created by a user), at 210, from which the structurally identical data targets are later derived.

The following describes variations of the subject matter of FIGS. 1 and 2 which may be implemented singly or in combination depending on the desired implementation.

Semantical partitioning as described herein enables an (enterprise) data warehouse to handle mass data. Semantical partitioning improves the performance for the staging processes and reduces the time needed to make data available for reporting. Instead of using one data target that stores a huge amount of data semantical partitioning involves the creation of multiple structurally identical data targets (meta data objects).

Every data target has its own data flow. A master object can used to define the meta data model of the data targets only once. All partitions can be created by using the master object as a template. This arrangement reduces the effort (total cost of ownership) to create a semantical partitioned model and avoid errors during manual creation of the partitioned objects. The consistency of the data model will be automatically controlled by the system.

Figure 3:
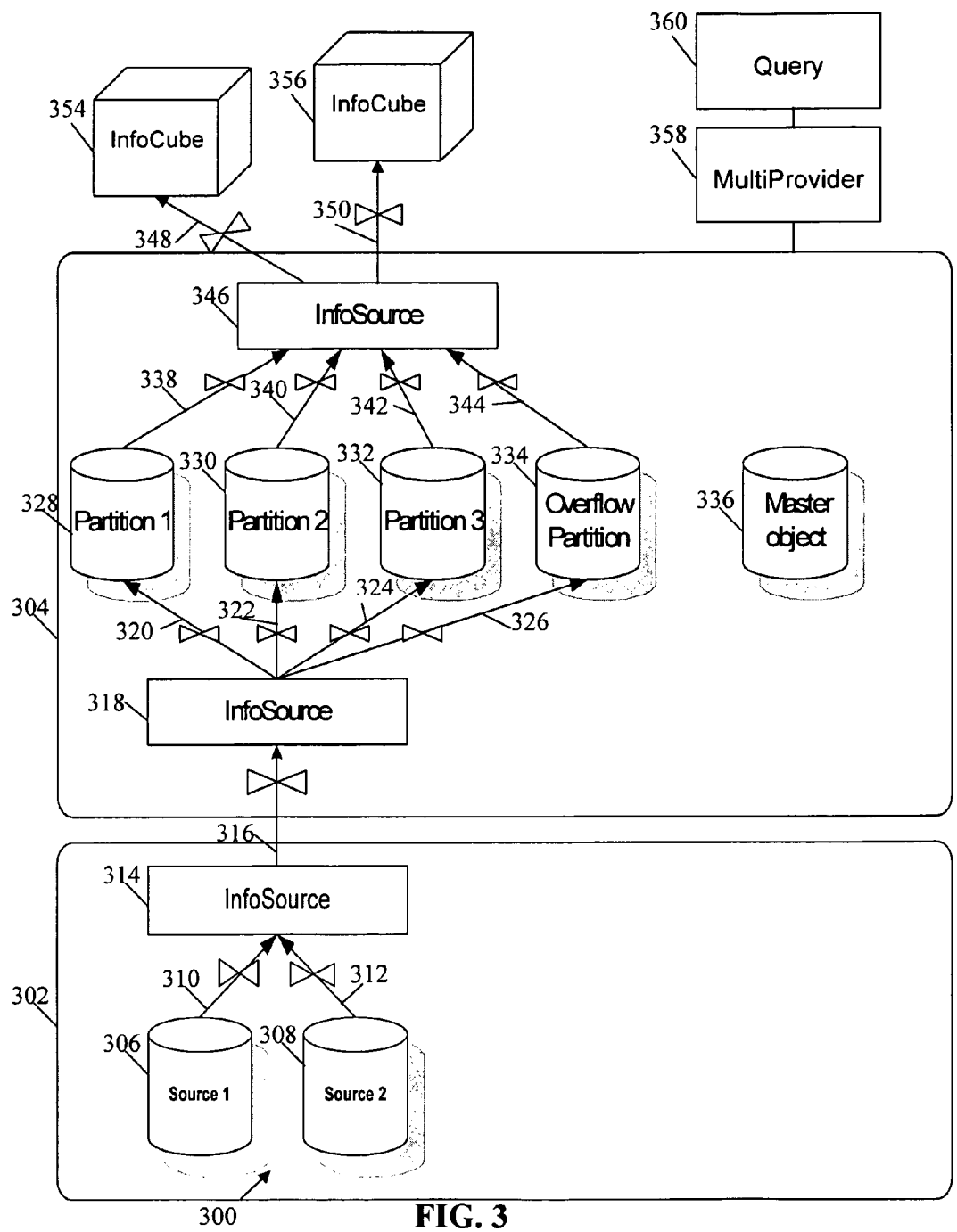
FIG. 3 is a schematic diagram illustrating a semantically partitioned data storage environment.

Semantical conditions define the assignment of data to the corresponding data targets. These conditions are used to assign a particular dataset to a data target during the data load. Conditions can be based on a wide variety of factors such as time zones, geographic locations, FIG. 3 illustrates a system 300 that includes data sources 306, 308, data collection modules 314, 318, 338, data targets 328, 330, 332, 334, a master object 336, and reporting modules 354, 356, 358, 360. The data sources 306, 308 are business warehouse data sources and can comprise SAP DataSources. The data collection modules 314, 318, 338 can comprise InfoSources. The data targets 328, 330, 332, 334 can comprise InfoProviders (which are also referred to herein as partitions, PartProviders, and overflow partitions). The reporting modules 354, 356 can comprise InfoCubes or the reporting modules 358 can comprise MultiProviders upon which a query 360 may be run.

For every specified partition criteria, such as an organizational unit or a time, a physical InfoProvider 328, 330, 332 (PartProvider) exists and is connected to a data source 306, 308 via a data transfer process and a transformation rule 310, 312, 320, 322, 324, 326.

One metadata object of each relevant type (e.g., DataStore object, InfoCubes, etc.) acts as a master object 336 which can be manually created by a user using a semantical partitioning object (SMO) user interface. Such master objects can be used as template to create the other PartProviders 328, 330, 332 in the model, which are dependent to the master object 336 and therefore are "read only".

The data transfer processes do not have a master object 336 because every process has a unique selection criterion (derived from the partition criteria) but they are also automatically generated by the SMO.

One additional PartProvider 336 (called "overflow bucket") can be optionally created. The Overflow PartProvider 334 can contain all datasets which do not fit to the other PartProvider 328, 330, 332, 334. The resulting partition criterion is the negation of all other partition criteria. This PartProvider 336 can be used to ensure that all datasets are fetched from the source. All PartProviders 328, 330, 332 can have a homogeneous structure and hold disjunctive data (a dataset with a specific key can be found only in one PartProvider).

A reporting layer can be enhanced by utilizing one or more of the InfoCubes 354, 356, a MultiProvider 358, and/or a query 360 based on the MultiProvider 358. Using InfoCubes instead of a MultiProvider can improve the reporting performance for scenarios in which the MultiProvider generates performance overhead.

Prior to the creation of a partitioned data model by the SMO, some components need to be pre-existing including at least one InfoSource 314 and one or more data sources 306, 308 which are respectively connected to the InfoSource 314 via transformation rules 310, 312. The illustrated InfoSource 314 assumes that data may have be consolidated from multiple source objects. In cases where data is not consolidated from multiple source objects, an InfoSource may not be required.

An InfoSource is a data collection module that describes a quantity of data available for a business transaction or a type of business transaction (e.g., cost center accounting, etc.). An InfoSource characterizes information that logically belongs together, summarized into a single unit. It prepares consolidated data for updating to the data targets. InfoSources contain either transaction data or master data (attributes, texts and hierarchies).

After a master object is created (e.g., generated by a user), an InfoSource is selected and one or more source objects. Based on these selections, following objects will be created by the SMO:

- At least one PartProvider 328, 330, 332
- One InfoSource 318 with an identical structure like the PartProvider
- 1:1 Transformation rules 320, 322, 324, 326 that connect the InfoSource 318 to the PartProvider(s) 328, 330, 332
- One Transformation 316 which connects the two InfoSources 314, 318 and acts as master
- Data transfer processes that contain the partition criteria and correspond to every PartProvider 328, 330, 332 which in turn correspond to each data source 306, 308.
- For extraction purposes an InfoSource 346 and corresponding data transfer processes 338, 340, 342 can be generated.

The second InfoSource 318 is introduced to prevent changes respectively re-generating transformations 338, 340, 342 that connect the PartProviders 328, 330, 332. All user specific coding and assigning is done on the master transformation 316 between the two InfoSources 314, 316. If the details of this master transformation 316, other transformations can remain unchanged. The InfoSource 318 will be generated with key fields. The key fields of the InfoSource 318 are identical to the key fields of the PartProviders 328, 330, 332.

A transformation consists of at least one transformation rule. Various rule types, transformation types, and routine types can be made available. Transformation rules map any number of source fields to at least one target field. A rule type is a specific operation that is applied to the relevant fields using a transformation rule. A transformation type determines how data is written into the fields of the target. A rule group is a group of transformation rules. Rule groups allow you to combine various rules. Routines can be used to implement complex transformation rules. Routines are available as a rule type. There are also routine types that you can use to implement additional transformations.

InfoProviders are metaobjects in a database that can be uniformly seen as data providers within a query definition, and whose data can also be reported uniformly. InfoProviders can include InfoCubes, ODS objects, InfoObjects, and InfoSets and the like. However, only persistent InfoProviders can be used as partitions. A MultiProvider is a type of InfoProvider that combines data from a number of InfoProviders and makes it available for reporting purposes. The MultiProvider does not itself contain any data. Its data comes entirely from the InfoProviders on which it is based. Such InfoProviders can be connected to one another by a union operation.

An InfoCube is a quantity of relational tables arranged according to the star schema. This arrangement means there is a (large) fact table that contains the key figures for the InfoCube as well as several (smaller) dimension tables which surround it. The characteristics of the InfoCube are stored in these dimensions.

The dimensions and the fact table are linked to one another via abstract identification numbers (dimension IDs), which are in the key part of the particular database table. As a result, the key figures of the InfoCube relate to the characteristics of the dimension. The characteristics determine the granularity (the degree of detail) at which the key figures are kept in the InfoCube.

Characteristics that logically belong together (district and area, for example, belong to the regional dimension) are grouped together in a dimension. By adhering to this design criterion, dimensions are to a large extent independent of each other, and dimension tables remain small with regards to data volume, which is desirable for reasons of performance. This InfoCube structure is optimized for reporting. The fact table and dimension tables are both relational database tables.

Figure 4:
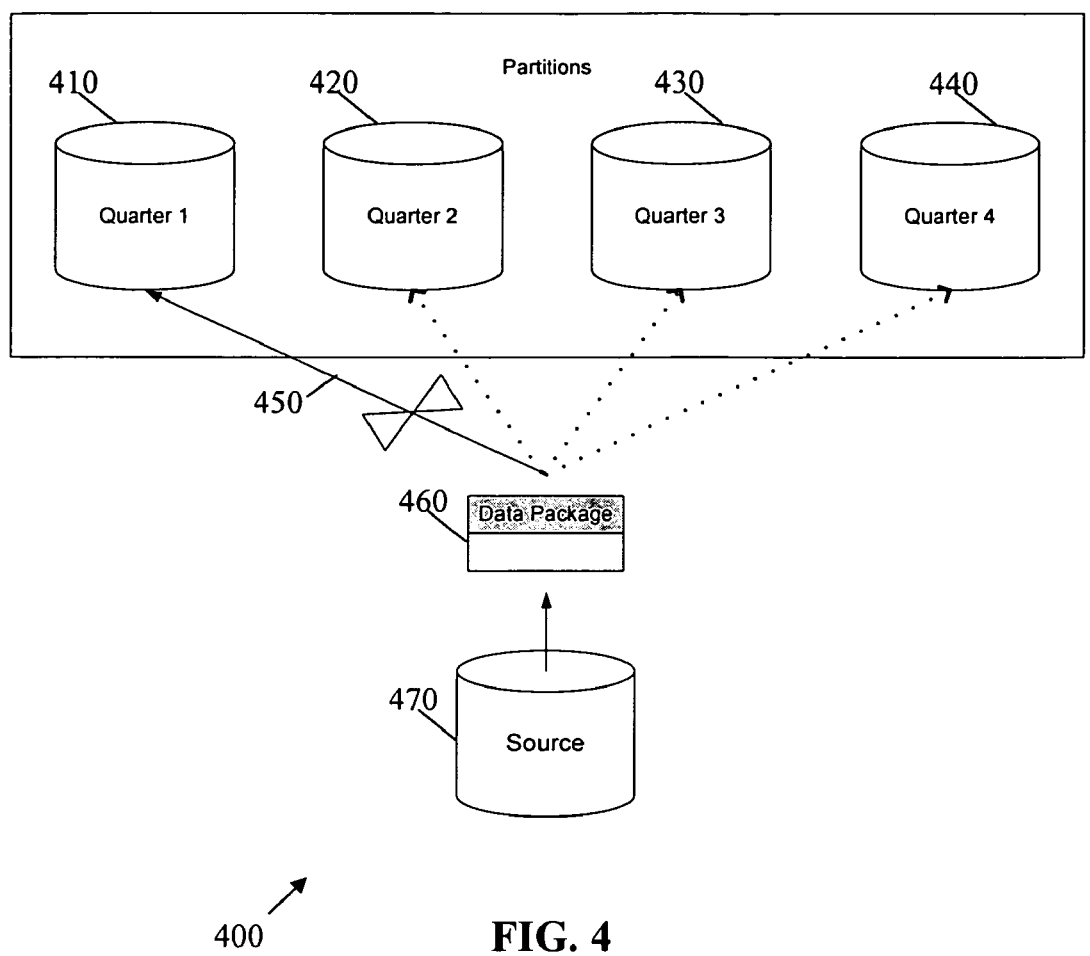
FIG. 4 is a schematic diagram illustrating a rolling window partition arrangement.

FIG. 4 is a schematic diagram 400 illustrating the extraction of data from a series of partitions 410, 420, 430, 440 which divide datasets according to fiscal quarters. In this arrangement, only one data flow 450 from a data package 460 coupled to a data source 470 to a partition 410 relating to Quarter 1 data is running. With this variation, only one dataflow to one partition is running at any given time. After all data is loaded in an active partition, the partition will be switched (e.g., from Quarter 1 partition 410 to Quarter 2 partition 420). In some implementations, when the last partition (e.g., Quarter 4 partition 440) can be recreated and used to that the overall number of partitions remains fixed.

Figure 5:
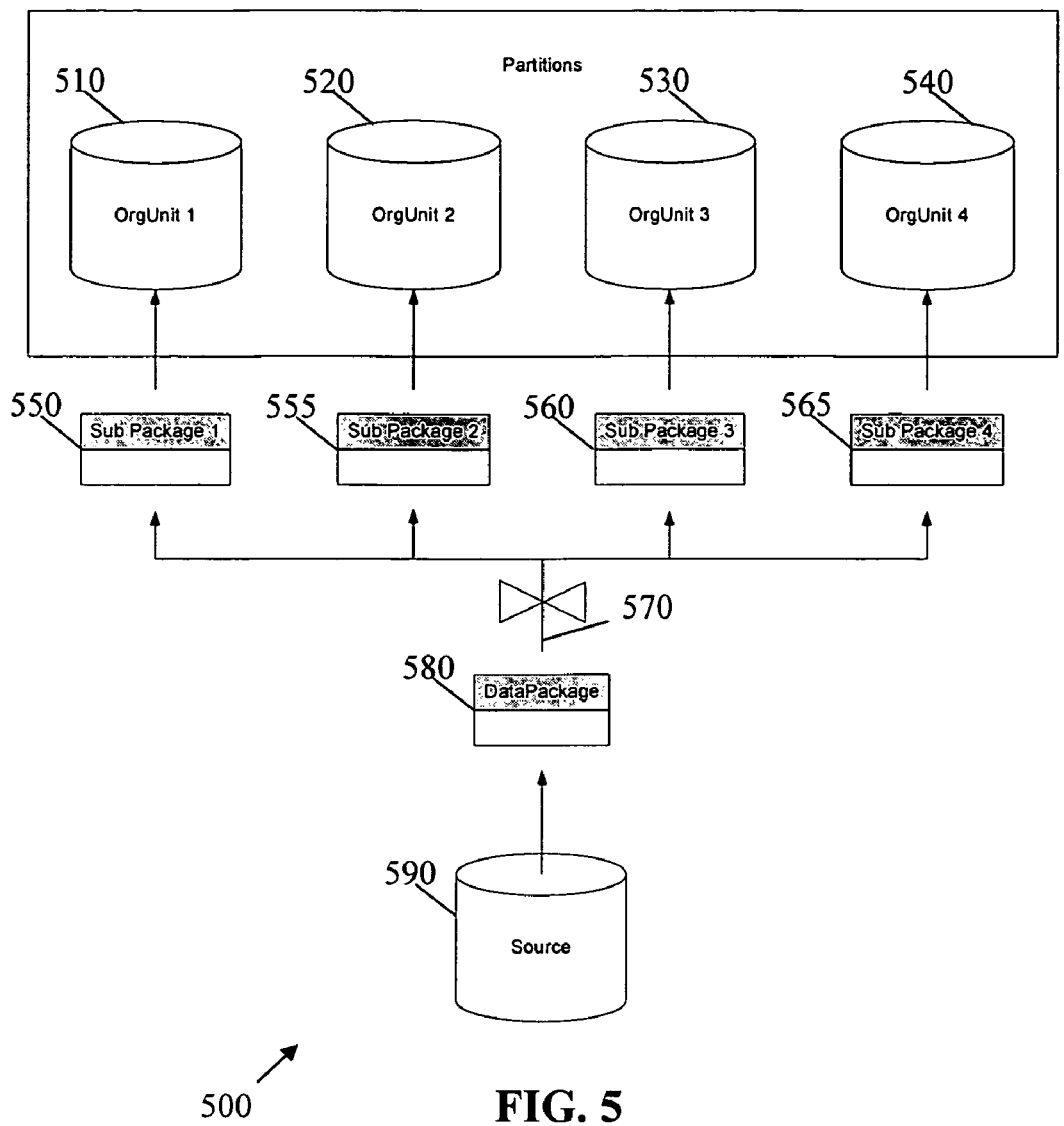
FIG. 5 is a schematic diagram illustrating an arrangement with multiple active partitions.

FIG. 5 is a schematic diagram 500 illustrating a further variation in which an extracted data package contains data for multiple packages. With this variation, there are four partitions 510, 520, 530, 540 which correspond to various organizational units within an enterprise. The data flow 570 of a data package 580 coupled to a data source 590 can be split into multiple sub-packages 550, 555, 560, 565 regarding the destination partitions 510, 520, 530, 540. With this implementation, multiple parallel data flows may run at the same time during one data load. Alternatively, data flows can be run in a staggered or delayed fashion in cases of time dependent loads and the like. This arrangement can also be combined with the arrangement of FIG. 4 in that if a PartProvider for an organizational unit is becoming too large, then the PartProvider can be partitioned with a rolling window partitioning algorithm.

The following provides a sample workflow that may be useful for understanding and implementing the subject matter described herein and which may form the basis of a user interface to solicit and obtain user input.

1. Maintain structure of semantically partitioned object;
2. Specify semantical partitions;
3. Generate all dependent objects according to FIG. 3;
4. Select or create an InfoSource as source and maintain master transformation;
5. Generate data transfer processes.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article for semantic partitioning data stored in a data warehouse environment, the article comprising a tangible machine-readable storage medium embodying instructions that when performed by one or more machines result in operations comprising:

extracting, in a data warehousing environment, data from one or more data sources;

transforming the extracted data to a format compatible with a plurality of structurally identical data targets; and loading, in parallel, the transformed data into the plurality of data targets via data transfer processes;

wherein:

the data targets comprises metaobjects in a database that is uniformly seen within a query definition and having data that is reported uniformly by one or more reporting modules, the data transfer processes define disjoint data sets among the plurality of data targets so that each data target includes a distinct data set, the transforming comprises automatically mapping data from the one or more data sources to data in the one or more data targets using predefined transformation rules, the transformation rules map any number of source fields to at least one target field, wherein routines are used to implement complex transformation rules, the routines are available as a rule type, the rule type is a specific operation applied to relevant fields using a transformation rule;

at least one of the reporting modules is a MultiProvider;

at least one of the reporting modules is an Infocube at least one of the data targets is an InfoProvider with data storage.

2. The article as in claim 1, wherein the loading comprises: concurrently loading the transformed data into at least two of the data targets.

3. The article as in claim 1, wherein the extracted data is aggregated in the MultiProvider to enable the extracted data to be reported.

4. The article as in claim 3, wherein the article is further operable to cause data processing apparatus to perform operations comprising:

generating a query on top of the MultiProvider.

5. The article as in claim 1, wherein the extracted data is populated in the InfoCube which comprises a plurality of relational tables arranged according to a star schema.

6. An article for semantically partitioning data stored in a data warehouse, the article comprising a tangible machine-readable storage medium embodying instructions that when performed by one or more machines result in operations comprising:

deriving a plurality of structurally identical data targets from a master object, the data targets comprising metaobjects in a database that is uniformly seen as data providers within a query definition and having data that is reported uniformly through one or more reporting modules; and defining disjoint data transfer processes coupling the data targets to one or more data sources, the data transfer processes defining disjoint semantic partitions among the plurality of structurally identical data targets so that each data target includes a distinct data set;

wherein at least one of the reporting modules is a MultiProvider;

wherein at least one of the reporting modules is an Infocube;

wherein at least one of the data targets is an InfoProvider with data storage.

7. The article as in claim 6, wherein the article is further operable to cause data processing apparatus to perform operations comprising:

defining an overflow data provider containing all data sets that are not associated with one or more of the data targets; and defining an overflow data transfer process coupling the overflow data provider to the one or more data sources.

8. A semantically partitioned data warehousing system comprising:

one or more data sources;

a first data collection module characterizing data available in the one or more data sources, the first data collection module being connected to the one or more data sources via a first set of transformations, the first set of transformations mapping data from the one or more data sources from a first format to a second format;

a second data collection module characterizing data available for the plurality of data targets, the second data collection module being connected to the first data collection module via a second transformation;

two or more structurally identical data targets, the data targets each being identically connected to the second data collection module via a third set of transformations, the data targets being respectively coupled to the one or more data sources by disjoint data transfer processes so that each data target includes a distinct data set, the data targets comprising metaobjects in a database that is uniformly seen as data providers within a query definition and having data that is reported uniformly; and one or more reporting modules to enable reporting the extracted data;

wherein:

at least one of the data collection modules comprises an InfoSource;

at least one of the reporting modules comprises a MultiProvider;

at least one of the data sources is an InfoProvider.

9. The system as in claim 8, wherein the disjoint data transfer processes are partitioned according to semantics, the semantics associating data sets derivable from the data sources with the data targets.

10. The system as in claim 8, further comprising:

a third data collection module characterizing data available in the one or more data targets.

11. The system as in claim 10, further comprising:

an overflow data provider characterizing all data sets that are not associated with one or more of the data targets, the overflow data provider being connected to the second data collection module.

12. The system as in claim 8, wherein the data targets are derived from a master meta data object.

13. The system as in claim 8, wherein the data targets hold disjunctive data sets.

* * * * *